(12) United States Patent
Wagner et al.

(10) Patent No.: US 9,851,005 B2
(45) Date of Patent: Dec. 26, 2017

(54) ACTUATOR WITH SCREW-IN GLAND AND DETENT STRUCTURE

(71) Applicant: LIPPERT COMPONENTS, INC., Elkhart, IN (US)

(72) Inventors: Ryan A. Wagner, Goshen, IN (US); Robert H. Schneider, Beaver Dam, WI (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 413 days.

(21) Appl. No.: 14/705,336

(22) Filed: May 6, 2015

(65) Prior Publication Data

US 2015/0323072 A1  Nov. 12, 2015

Related U.S. Application Data

(60) Provisional application No. 61/988,979, filed on May 6, 2014.

(51) Int. Cl.

| F16J 1/04 | (2006.01) |
|---|---|
| F16J 1/09 | (2006.01) |
| F16J 9/20 | (2006.01) |
| F16J 10/02 | (2006.01) |
| F16J 1/00 | (2006.01) |
| F16J 9/06 | (2006.01) |
| F15B 15/26 | (2006.01) |
| F15B 15/14 | (2006.01) |

(52) U.S. Cl.
CPC ............... *F16J 1/04* (2013.01); *F15B 15/261* (2013.01); *F16J 1/008* (2013.01); *F16J 1/09* (2013.01); *F16J 9/06* (2013.01); *F16J 9/20* (2013.01); *F16J 10/02* (2013.01); *F15B 15/1447* (2013.01)

(58) Field of Classification Search
CPC ..... F16J 1/04; F15B 15/1442; F15B 15/1452; F15B 15/149; F15B 15/261
USPC ................................. 92/23, 26, 163
See application file for complete search history.

(56) References Cited

U.S. PATENT DOCUMENTS

| 2,297,902 | A | * | 10/1942 | Levy | ..................... F15B 15/261 |
| | | | | | 92/26 |
| 3,850,080 | A | * | 11/1974 | Ekstrom | ............. F15B 15/1433 |
| | | | | | 91/395 |
| 4,381,047 | A | * | 4/1983 | Gregoire | ................. F16D 65/54 |
| | | | | | 188/196 P |
| 6,318,237 | B1 | * | 11/2001 | Muller | .................. F15B 15/261 |
| | | | | | 91/41 |
| 6,568,313 | B2 | * | 5/2003 | Fukui | .................. F15B 15/1452 |
| | | | | | 92/168 |

(Continued)

*Primary Examiner* — Thomas E Lazo
(74) *Attorney, Agent, or Firm* — Barnes & Thornburg LLP

(57) ABSTRACT

A fluid actuator includes housing defining a cylinder bore and first and second fluid passages. A circumferential detent groove extends into the housing from the cylinder bore. The cylinder bore receives a piston having a top face and a skirt in sliding engagement. A circumferential detent ring groove extends radially inwardly into the skirt. The detent ring groove has a first portion of a first depth and a second portion of a second, greater depth. An o-ring is at least partially received in the second portion. A wear ring is at least partially received in the first portion and overlies the o-ring. The o-ring biases the wear ring outwardly of the detent ring so that the wear ring may be selectively engaged with the detent groove.

20 Claims, 5 Drawing Sheets

(56) References Cited

U.S. PATENT DOCUMENTS 6,691,607 B2 * 2/2004 Vatterott ............. F16J 15/3236
92/240
8,690,128 B1 * 4/2014 Schwindaman .... F15B 15/1428
254/423

* cited by examiner

ACTUATOR WITH SCREW-IN GLAND AND DETENT STRUCTURE

CROSS-REFERENCE TO RELATED APPLICATIONS

This application claims benefit of U.S. Provisional Patent Application No. 61/988,979, filed on May 6, 2014, the disclosure of which is incorporated herein by reference in its entirety.

BACKGROUND OF THE DISCLOSURE

This disclosure is directed to an actuator as might be used, for example, as part of a jack. One such actuator is shown and described in U.S. Pat. No. 8,690,128, the disclosure of which is incorporated herein by reference in its entirety.

DETAILED DESCRIPTION OF THE DRAWINGS

Figure 1:
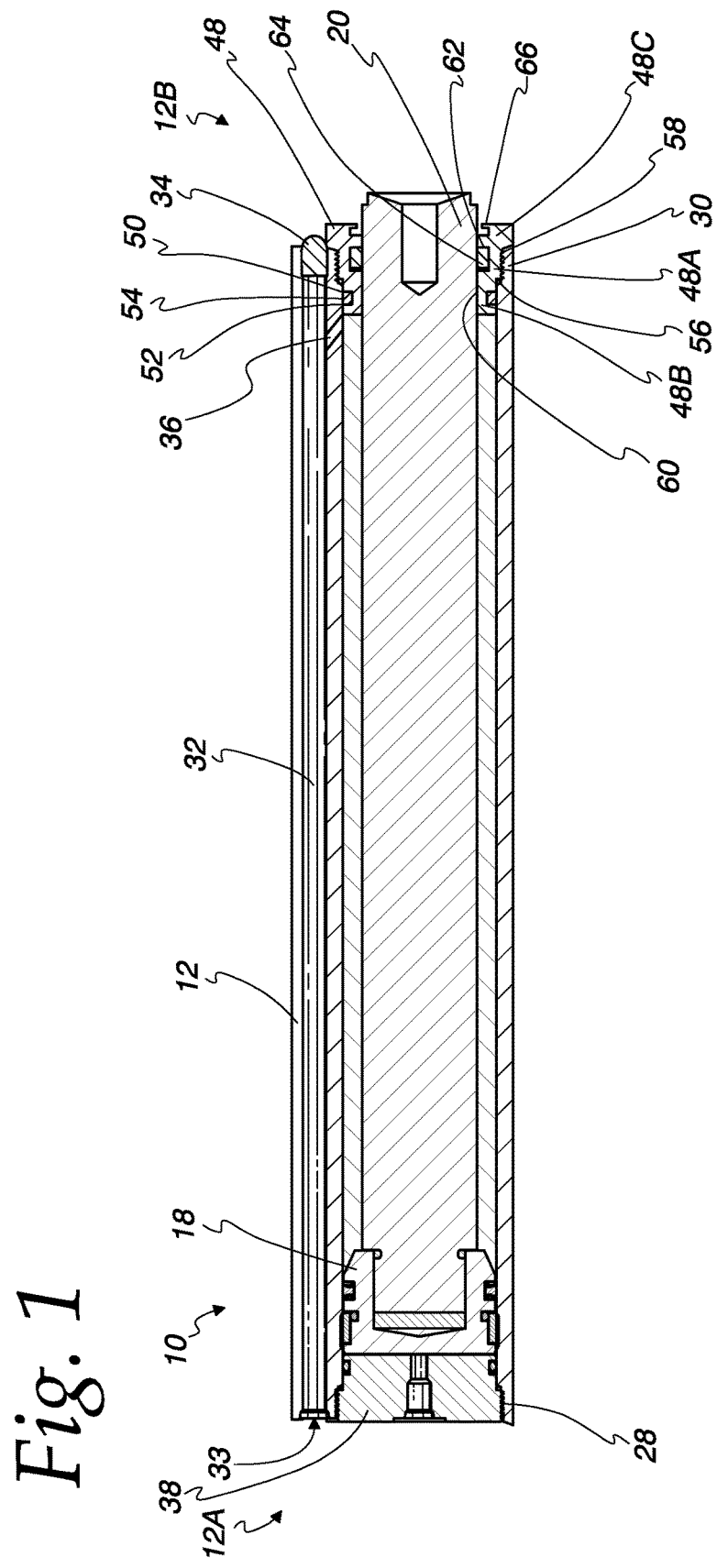
FIG. 1 is a cross-sectional side view of an illustrative actuator including a housing defining a cylinder bore, a piston in sliding engagement with the cylinder bore, and a piston rod connected to the piston, with the piston in a fully retracted position.
Figure 2:
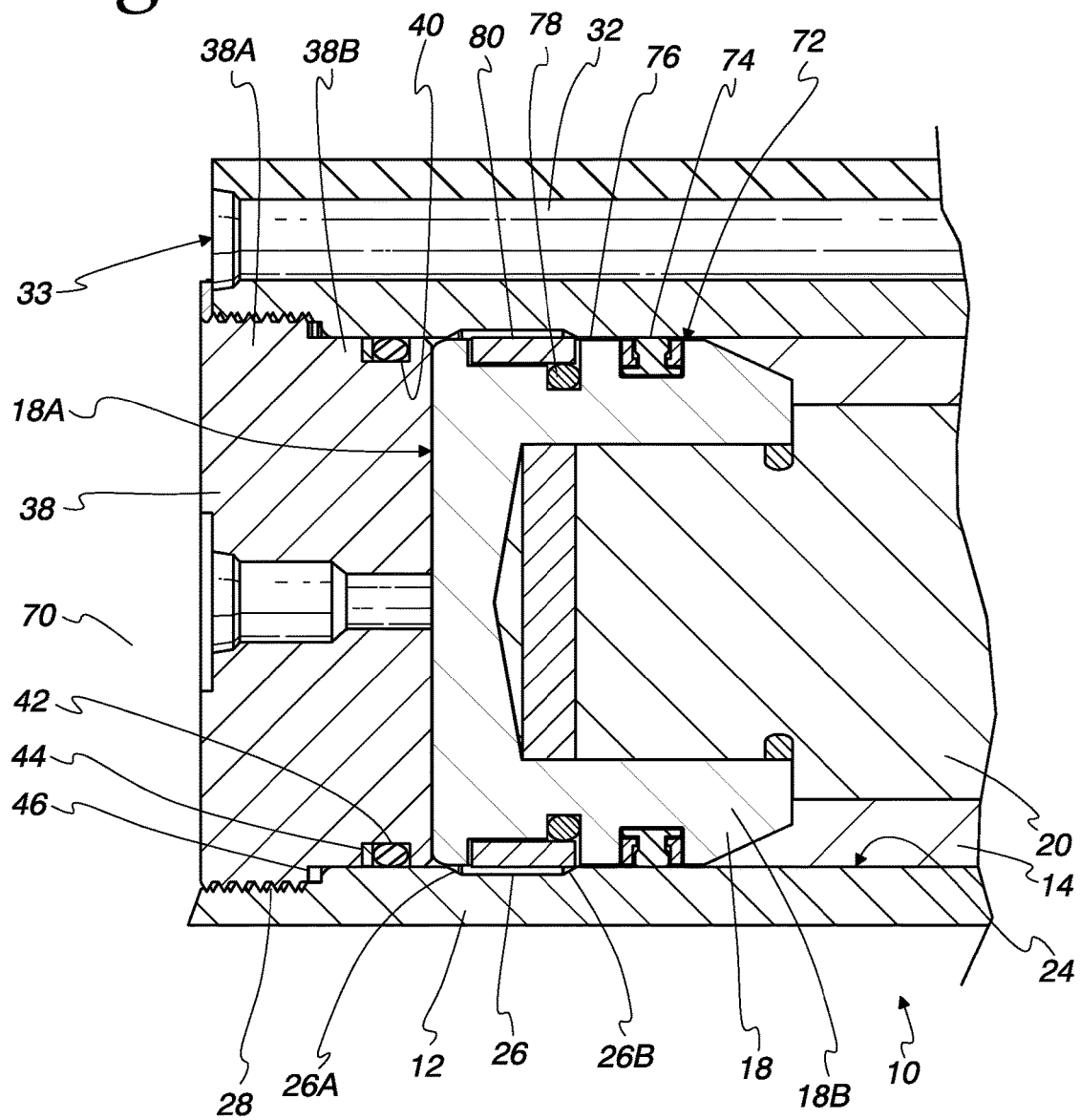
FIG. 2 is a cross-sectional side view of a portion of the actuator of FIG. 1, with the piston in a fully retracted position.
Figure 3:
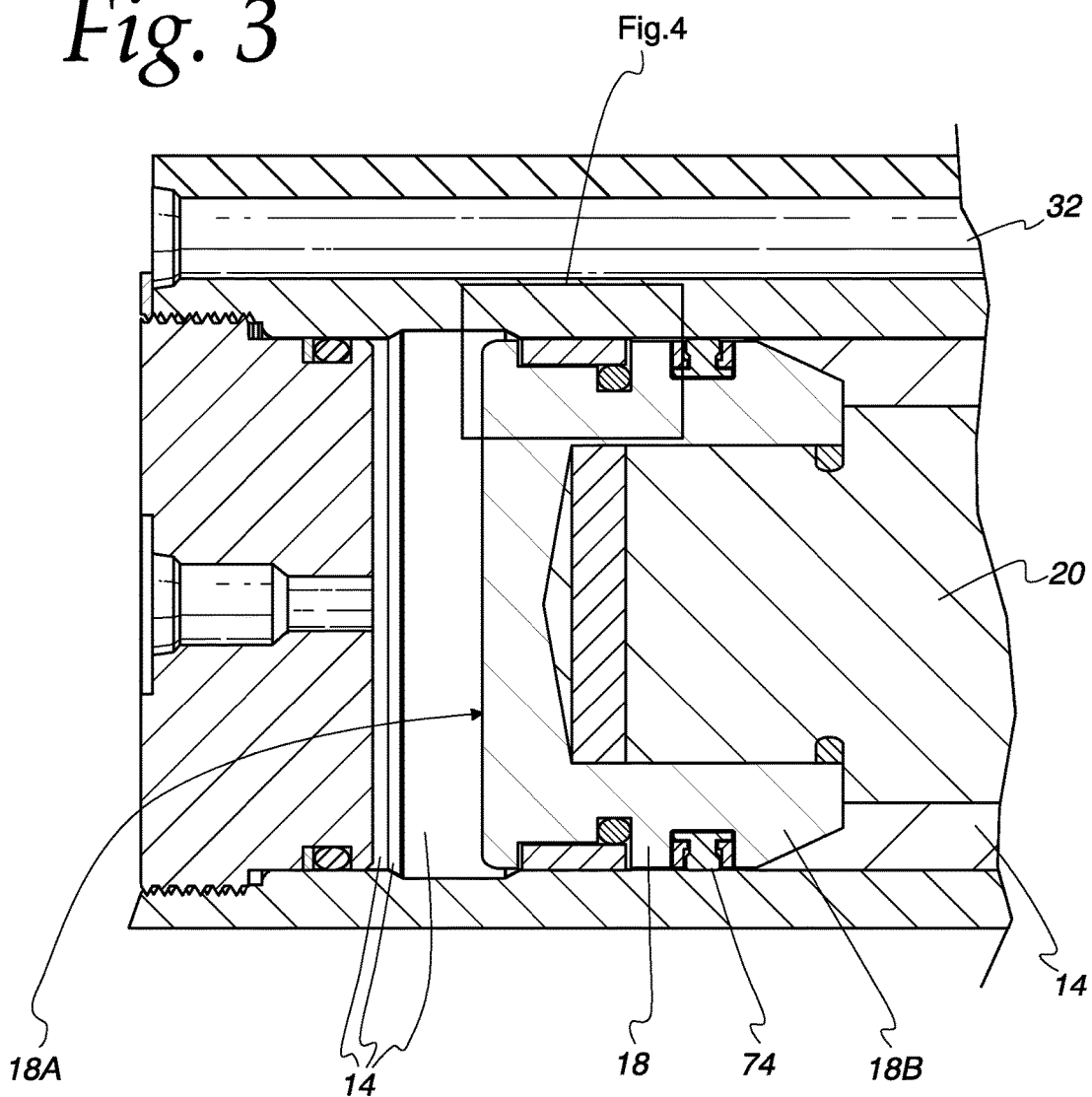
FIG. 3 is a cross-sectional side view of a portion of the actuator of FIG. 1, with the piston in a partially extended position.
Figure 4:
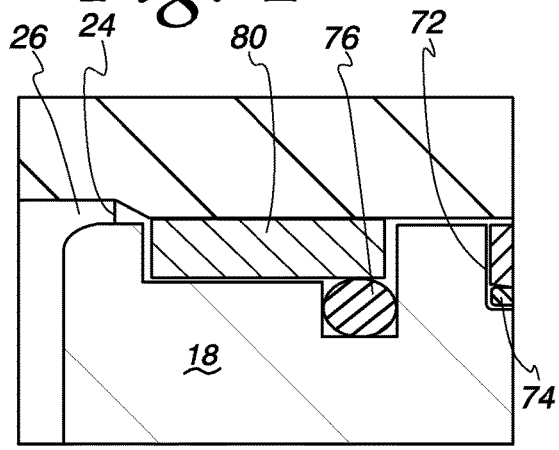
FIG. 4 is a cross-sectional side view of a portion of the actuator of FIG. 1, with the piston in a partially extended position and a detent mechanism in a retracted position.
Figure 4A:
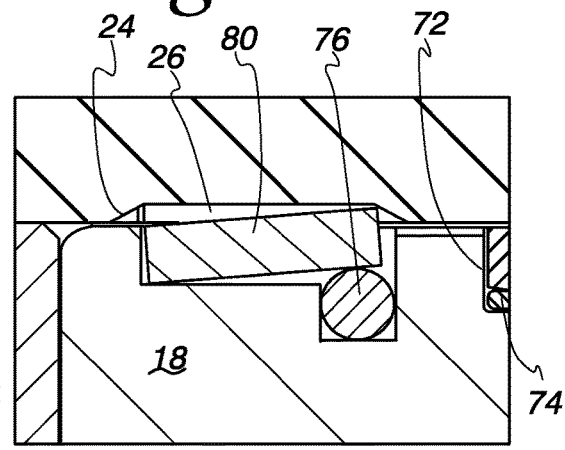
FIG. 4A is a cross-sectional side view of a portion of the actuator of FIG. 1, with the piston in a partially extended position and a detent mechanism in a retracted position.
Figure 5:
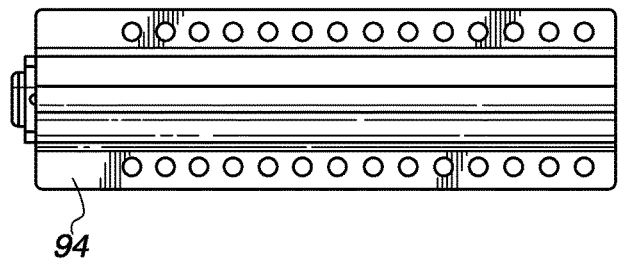
FIG. 5 is a top plan view of the actuator of FIG. 1.
Figure 6:
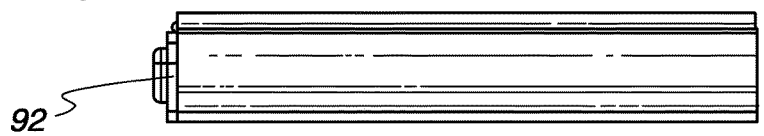
FIG. 6 is a side elevation view the actuator of FIG. 1.
Figure 7:
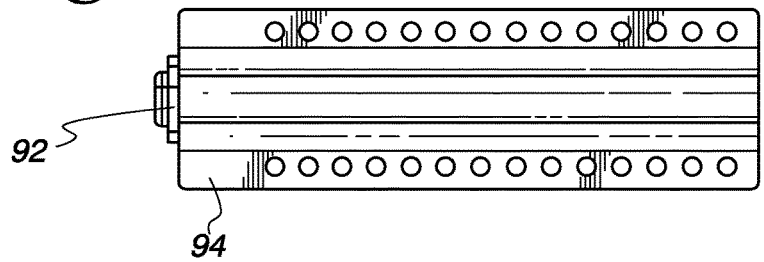
FIG. 7 is a bottom plan view of the actuator of FIG. 1.

The drawings show an illustrative embodiment of an actuator 10 including a housing 12 defining a cylinder bore 14, a piston 18 in sliding engagement with the cylinder bore, and a piston rod 20 connected to the piston. FIGS. 1, 2, and 4A show piston 18 and piston rod 20 in a fully retracted position. FIGS. 3 and 4 show piston 18 and piston rod 20 in a partially extended position.

Housing 12 may be made of aluminum or another suitable material. Housing 12 has a first (sometimes referred to herein as "upper") end 12A and a second (sometimes referred to herein as "lower") end 12B. Cylinder bore 14 has a first open end near first end 12A of housing 12 and a second open end near second end 12B of housing 12. Cylinder bore 14 is defined by a sidewall 24 having a substantially constant first diameter extending from the first end of cylinder bore 14 to the second end thereof, except for detent groove 26 located at a first predetermined distance from the first end of cylinder bore 14. Detent groove 26 extends diametrically outwardly from cylinder bore 14, into housing 12. Sidewall 24 in the region of detent groove 26 has a substantially constant second diameter greater than the first diameter of cylinder bore 14, except for a first ramped transition portion 22A connecting sidewall 24 of detent groove 26 with sidewall 24 of cylinder bore 14 relatively near first end 12A of housing 12 and a second ramped transition portion 22B connecting sidewall 24 of detent groove 26 with sidewall 24 of cylinder bore 14 relatively near second end 12B of housing 12.

Housing 12 also defines a first internally threaded counterbore 28 between the first end of cylinder bore 14 and first end 12A of housing 12, and a second internally threaded counterbore 30 between the second end of cylinder bore 14 and second end 12B of housing 12. First and second counterbores 28, 30 have diameters somewhat greater than the diameter of cylinder bore 14.

Housing 12 further defines a first fluid passage 32 distinct from cylinder bore 14 and extending generally from first end 12A of housing 12 to second end 12B of housing 12. A first end of first fluid passage 32 defines a fluid port 33. Fluid port 33 may be internally threaded or otherwise configured to receive or interconnect with a hose, fitting, or other structure connecting fluid port 33 to a source of working fluid, for example, hydraulic fluid or air, for operating actuator 10. An end plug 34 closes the otherwise open second end of fluid passage 32. Fluid passage 32 need not extend entirely to second end 12B of housing 12. In such an embodiment, a separate end plug 34 would be unnecessary and could be omitted. A second fluid passage 36 links first fluid passage 32 to cylinder bore 14 in fluid communication near second end 12B of housing 12.

Housing 12 may include one or more flanges 94 extending outwardly therefrom, each defining one or more apertures 96 to facilitate mounting of actuator 10 to another structure. The other structure may be, for example, a motorized or towed recreational vehicle. In the illustrated embodiment, flanges 94 extend generally tangentially from an outer surface of housing 12 about cylinder bore 14.

Figure 8:
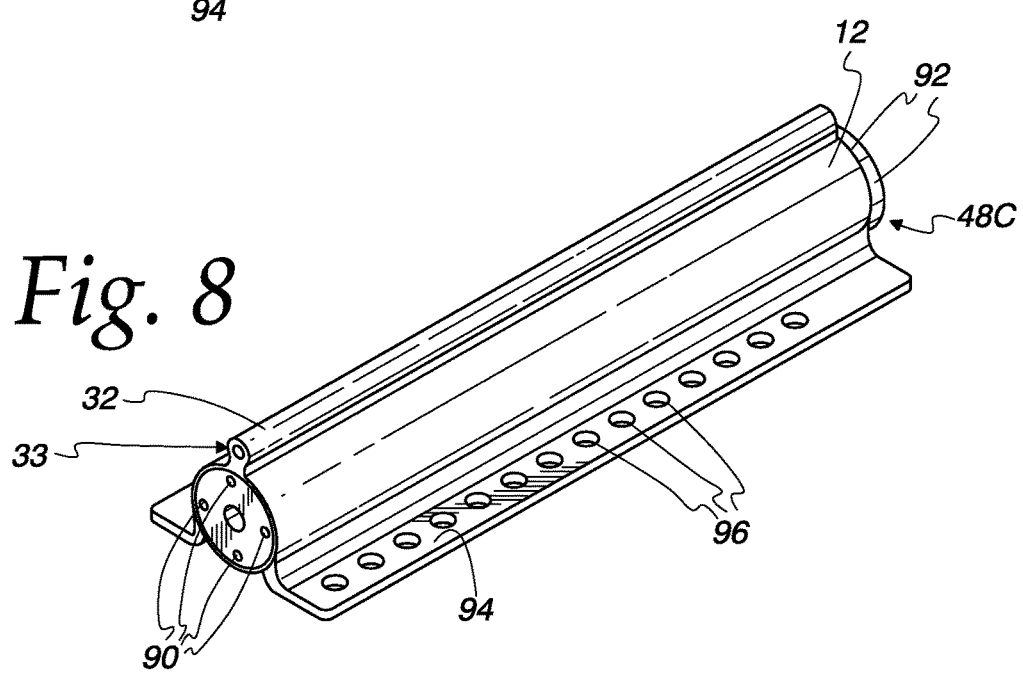
FIG. 8 is a perspective view of the actuator of FIG. 1.
Figure 9A:
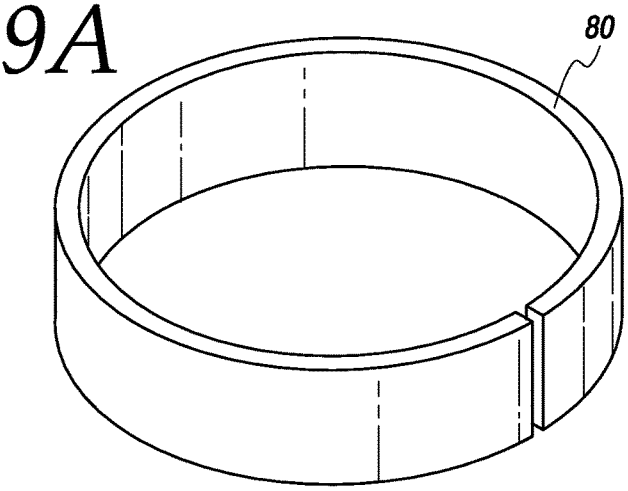
FIG. 9 is a view of a wear ring.
Figure 9B:
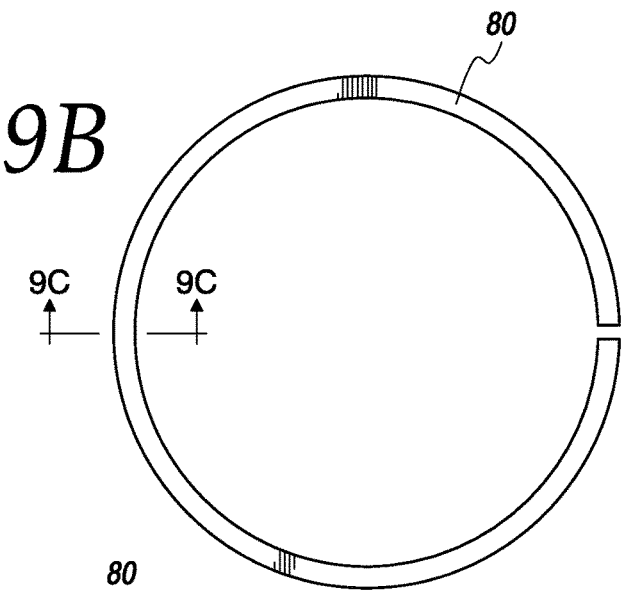
Figure 9C:
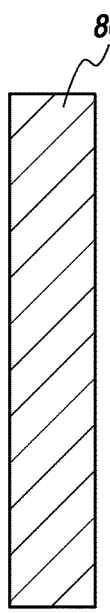

A first cylinder end cap (or plug) 38 is configured for attachment to first end 12A of housing 12 in threaded and sealing engagement therewith. First end cap 38 has a generally stepped cylindrical form, with an externally threaded first portion 38A configured for threaded engagement with first counterbore 28, and a second portion 38B having a diameter generally complementary to the first diameter of cylinder bore 14, such that first end cap 38 can be freely screwed into housing 12. As shown in FIG. 8, the outer face of first end cap 38 may include pin-receiving cavities 90 or other features for receiving a tool (not shown) that may be used to facilitate assembly and disassembly of first end cap 38 to and from housing 12.

A seal groove 40 extends circumferentially about and radially inwardly from the outer surface of second portion 38B of first end cap 38. A first seal 42, for example, an o-ring, may be provided in seal groove 40. A second seal 44, for example, a rectangular profile seal ring may also be provided in seal groove 40. First and second seals 42, 44 may provide a substantially fluid tight seal between first end cap 38 and cylinder bore 14. A third seal 46, for example, a square or rectangular profile seal ring may be provided at the transition between first portion 38A and second portion 38B of first end cap 38. Third seal 46 may provide a substantially fluid tight seal between first end cap 38 and housing 12. First, second and third seals 42, 44, 46 may cooperate to effect a substantially fluid tight seal between first end cap 38 and housing 12.

First end cap 38 defines a fluid port 70 extending therethrough from an outer face thereof to an inner face thereof. At least a portion of the outwardly-facing end of fluid port 70 may be internally threaded or otherwise configured to receive or interconnect with a hose, fitting, or other structure connecting fluid port 70 to a source of working fluid for operating actuator 10.

A second cylindrical end cap (or plug) 48 is configured for attachment to second end 12B of housing 12 in threaded and sealing engagement. Second end cap 48 has a generally stepped cylindrical form, with an externally threaded first portion 48A configured for threaded engagement with second counterbore 30, a second portion 48B having a diameter generally complementary to the first diameter of cylinder bore 14, such that second end cap 48 can be freely screwed into housing 12, and a third portion 48C overlying at least a portion of the end of housing 12 when second end cap 48 is assembled thereto. As shown in FIGS. 5-8, third portion 48C of second end cap 48 may be provided with flats 92 for receiving a tool (not shown) that may be used to facilitate assembly and disassembly of second end cap 48 to and from housing 12.

A seal groove 50 extends circumferentially about and radially inwardly from the outer surface of second portion 48B of second end cap 48. A fourth seal 52, for example, an o-ring, may be provided in seal groove 50. A fifth seal 54, for example, a rectangular profile seal ring may also be provided in seal groove 50. Fourth and fifth seals 52, 44 may provide a substantially fluid tight seal between second end cap 48 and cylinder bore 14. A sixth seal 56, for example, a rectangular profile seal ring may be provided at the transition between first portion 48A and second portion 48B of second end cap 48. A seventh seal 58, for example, an o-ring, may be provided at the transition between first portion 48A and third portion 48C of second end cap 48. Sixth and seventh seals 56, 58 may provide a substantially fluid tight seal between second end cap 48 and housing 12, Fourth through seventh seals 52, 54, 56, 58 may cooperate to effect a substantially fluid tight seal between second end cap 48 and housing 12.

Second end cap 48 defines a generally cylindrical aperture 60 therethrough configured to receive piston rod 20 in sliding and sealing engagement. A second seal groove 62 may be located between the first and second ends of second end cap 48 and extending circumferentially about and radially outwardly from an inner surface of aperture 60. An eighth seal 64 is received within second seal groove 62. A third seal groove 66 may be located between the first end of second end cap 48 and second seal groove 6. Third seal groove 66 extends radially outwardly from an inner surface of aperture 60. A ninth seal 68 is received within third seal groove 66. At least a portion of ninth seal 69 may be configured as a wiper. Eighth and ninth seals 64, 68 cooperate to effect a substantially fluid-tight seal between piston rod 20 and second end cap 48.

Piston 18 is slidingly engaged with cylinder bore 14 and may travel substantially between contact with first end cap 38 and second end cap 48. Piston 18 includes a top face 18A and a skirt 18B. A first seal groove 72 extends circumferentially about and radially inwardly from an exterior surface of piston skirt 18B. A tenth seal 74 is disposed within first seal groove 72 of piston 18. Seal 74 is shown as a double cup seal or T-seal, but could be embodied in other forms. A detent ring groove 76 extends circumferentially about and radially inwardly from an exterior surface of piston skirt 18B. Detent ring groove 76 has a stepped square contour. That is, a portion of detent ring groove 76 extends radially inwardly to a first depth or diameter, and a second portion of detent ring groove 76 extends radially inwardly to a second depth or diameter. The second depth is greater than the first depth. Put another way, the second diameter is lesser than the first diameter.

An eleventh seal 78, for example, an o-ring, is disposed partially within the deeper portion of detent ring groove 76. That is, a portion of eleventh seal 78 is proud of the circumferential surface defined by the first portion of second seal groove 76. A wear ring 80 is disposed within the shallower portion of detent ring groove 76 such that a portion of wear ring 80 overlies at least a portion of eleventh seal 78. Wear ring 80 is shown as an annular, open-ended ring having a rectangular cross-section. Wear ring 80 could be made of nylon/fiberglass or another material.

The end of skirt portion 18B of piston 18 opposite face 18A is tapered radially inwardly so that second fluid passage 36 may communicate with cylinder bore 14 even when piston 18 is bottomed out against second end cap 48. Such fluid communication between second fluid passage 36 and cylinder bore 14 with piston 18 bottomed out against second end cap 48 could be achieved in other ways, as well. For example, skirt portion 18B could be untapered, and a fluid-communicating notch could be defined thereby.

Piston rod 20 may be connected to piston 18, for example, by a threaded connection. For example, piston rod 20 may include an externally threaded region proximate the end thereof that connects to piston 18, and piston 18 may include a complementary, internally threaded portion on the underside thereof. The threaded connection of piston rod to piston 18 could be secured using a suitable thread locking structure or thread locking compound, for example, Loctite®.

The components of actuator 10 may be made of any suitable materials. For example, housing 12, and caps 38, 48, piston 18, and piston rod 20 may be made of steel or aluminum. The various seals may be made of any material having suitable flexibility, resiliency, and sealing characteristics to function as described herein, for example, buna-n or Viton®, among others.

In use, actuator 10 may filled with a working fluid and connected to a source of additional working fluid that may be selectively supplied under pressure to actuator 10 through fluid ports 33, 70. The working fluid may be selectively pressurized by a hydraulic pump, an air compressor, an accumulator, and/or another structure (not shown).

With piston 18 initially bottomed out against second end cap 48, working fluid may be supplied under pressure through fluid port 33. The working fluid is communicated through first fluid passage 32 and second fluid passage 36 to the underside of piston 18. At the same time, working fluid on the upper side of piston 18 may be relieved through fluid port 70, for example, to a reservoir (not shown). Seal 74 cooperates with sidewall 24 of cylinder bore 14 to preclude the pressurized working fluid from migrating to the upper side of piston 18. Seal 78 and wear ring 80 may assist in precluding the pressurized working fluid from migrating to the upper side of piston 18. The resulting differential pressure acting on piston 18 causes piston 18 to move toward first end cap 38 until further application of pressure to the underside of piston 18 is halted. If not halted at an intermediate position, piston 18 may travel until it tops out against first end cap 38.

With piston 18 topped out against first end cap or at another predetermined point in its travel, seal 78 may expand to force wear ring 80 at least partially into detent groove 26. This is best shown in FIG. 4A. With wear ring 80 thus disposed within detent groove 26, wear ring 80 and detent groove 26 (and seal 78) cooperate to preclude piston 18 and piston rod 20 from moving toward second end cap 48, even if actuator 10 is oriented vertically with second end cap 48 facing downwardly and working fluid is removed from underneath piston 18, for example, due to a fluid leak.

With piston 18 initially topped out against first end cap 38, working fluid may be provided under pressure though fluid port 70 to the upper side of piston 18, while fluid on the underside of piston 18 is relieved through fluid port 33, for example, to a reservoir. Seal 74 cooperates with sidewall 24 of cylinder bore 14 to preclude the pressurized working fluid from migrating to the lower side of piston 18. Seal 78 and wear ring 80 may assist in precluding the pressurized working fluid from migrating to the lower side of piston 18. The resulting differential pressure acting on piston 18 causes piston 18 to move toward second end cap 48 until further application of pressure to the upper side of piston 18 is halted. As piston 18 is initially forced toward second end cap 48, the leading edge of wear ring 80 cooperates with second transition portion 26B of detent grove 26 to force wear ring 80 back into its corresponding portion of seal groove 76. Wear ring 80, in turn, compresses seal 78, forcing seal 78 into its corresponding portion of seal groove 76. One piston 18 travels sufficiently toward second end cap 48, wear ring 80 becomes fully seated within its corresponding portion of seal groove 76. If not halted at an intermediate position, piston 18 may travel toward second end cap 48 until it bottoms out against second end cap 48.

A foot pad may be attached to the free end of piston rod 20. So configured, actuator 10 could be used as a jack.

The embodiments shown and described herein are illustrative and not limiting. One skilled in the art would recognize that features disclosed in connection with one embodiment could be combined with features of another embodiment and that aspects of the embodiments disclosed herein could be modified without departure from the scope of the appended claims.

The invention claimed is:

1. A fluid actuator comprising:
 a housing having a first end and a second end, the housing defining;
  a cylinder bore extending from the first end of the housing to the second end of the housing, the cylinder bore having a first threaded portion proximate the first end of the housing and a second threaded portion proximate the second end of the housing;
  a circumferential detent groove extending into the housing from the cylinder bore, the circumferential detent groove located between the first threaded portion and the second threaded portion;
  a first fluid passage extending from the first end of the housing toward the second end of the housing; and
 a second fluid passage connecting the first fluid passage and the cylinder bore in fluid communication;
  a first cylinder end cap having a first side and a second side, the first cylinder cap threadingly engaged with the first threaded portion, the first cylinder cap defining a third fluid passage extending from the first side thereof to the second side thereof;
  a second cylinder end cap having a first side and a second side, the second cylinder cap threadingly engaged with the second threaded portion, the second cylinder cap defining an aperture extending from the first side thereof to the second side thereof;
  a piston slidably received in the cylinder bore between a first travel limit proximate the first cylinder end cap and a second travel limit proximate the second cylinder end cap, the piston having a top face and a skirt, the top face of the piston facing the first cylinder end cap, the skirt defining a circumferential detent ring groove, the detent ring groove having a first region having a first depth and a second region having a second depth, the second depth being greater than the first depth;
  a piston rod connected to and extending from the piston opposite the top face, the piston rod slidingly engaged with the aperture in the second cylinder end cap;
  an o-ring at least partially disposed in the second region of the detent ring groove; and
  a wear ring at least partially disposed in the detent ring groove and overlying the o-ring;
   wherein the wear ring is selectively engageable with the detent groove.

2. The fluid actuator of claim 1, the first fluid passage extending to the second end of the housing.

3. The fluid actuator of claim 2 further comprising a closure closing the first fluid passage proximate the second end of the housing.

4. The fluid actuator of claim 1, the skirt further defining a circumferential seal groove and the fluid actuator further comprising a seal partially disposed within said seal groove.

5. The fluid actuator of claim 1, the o-ring biasing the wear ring outwardly of the detent ring groove.

6. The fluid actuator of claim 1, the first cylinder end cap having a threaded portion threadingly engaged with the first threaded portion of the cylinder bore and an unthreaded portion disposed within the cylinder bore between the first threaded portion of the cylinder bore and the second threaded portion of the cylinder bore.

7. The fluid actuator of claim 1, the first cylinder end cap defining a circumferential seal ring groove.

8. The fluid actuator of claim 7 further comprising a first seal ring disposed in the seal ring groove.

9. The fluid actuator of claim 8 further comprising a second seal ring disposed in the seal ring groove.

10. The fluid actuator of claim 9, one of the first and second seal rings being an o-ring.

11. The fluid actuator of claim 9, one of the first and second seal rings being a rectangular profile seal ring.

12. The fluid actuator of claim 1, an end of the skirt opposite the top face of the piston being configured to permit fluid communication between the second fluid passage and the cylinder bore when the piston is at the second travel limit.

13. The fluid actuator of claim 12, the end of the skirt opposite the top face of the piston being tapered radially inwardly.

14. The fluid actuator of claim 1 further comprising a working fluid admitted to the cylinder bore under pressure through the third fluid passage.

15. The fluid actuator of claim 14 wherein the working fluid biases the piston toward the second end of the cylinder.

16. The fluid actuator of claim 1 further comprising a working fluid admitted to the cylinder bore under pressure through the first and second fluid passages.

17. The fluid actuator of claim 16 wherein the working fluid biases the piston toward the first end of the cylinder.

18. The fluid actuator of claim 1 wherein the weight of the piston and the piston rod is insufficient to cause the wear ring to become disengaged from the detent groove when the actuator is oriented with the second end of the cylinder lower than the first end of the cylinder.

19. The fluid actuator of claim 1 wherein the weight of the piston, the piston rod, and a foot pad attached to the piston rod is insufficient to cause the wear ring to become disengaged from the detent groove when the actuator is oriented with the second end of the cylinder lower than the first end of the cylinder.

20. The fluid actuator of claim 1 wherein the wear ring is discontinuous.

* * * * *